Sept. 15, 1959   C. R. SEBENS   2,904,686
DOUBLE-NULLING RADIATION COMPARISON SYSTEM
Filed Sept. 27, 1955
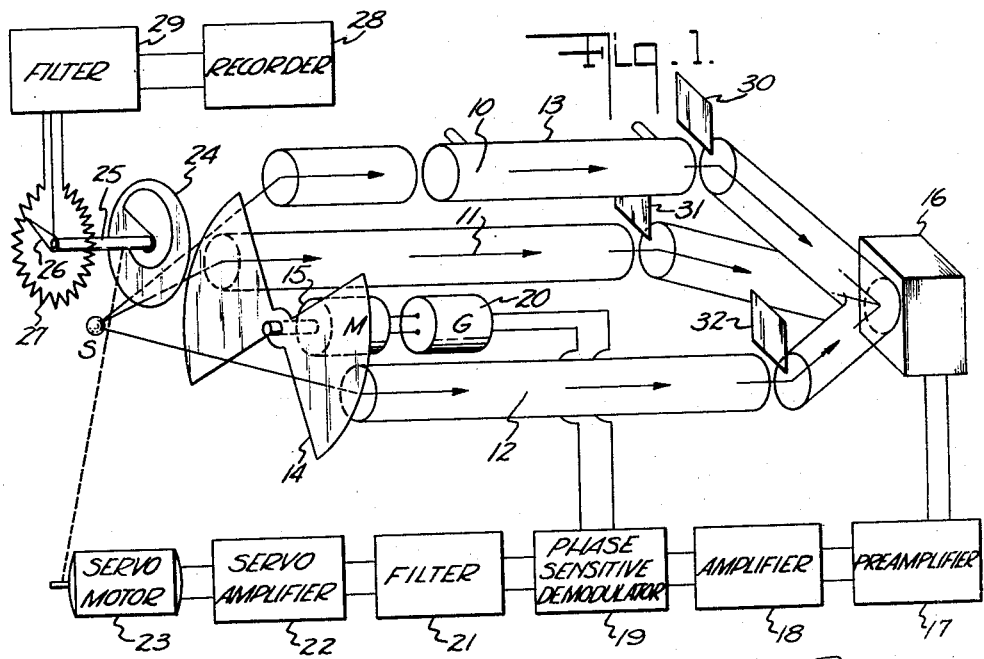
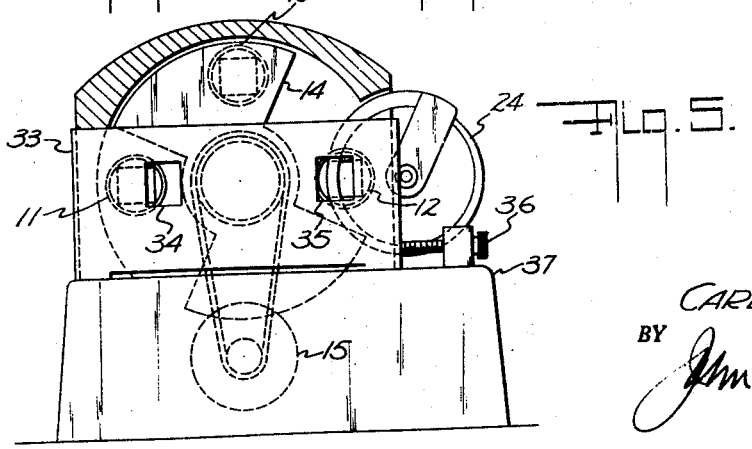
INVENTOR.
CARL R. SEBENS
BY
ATTORNEY United States Patent Office 2,904,686
Patented Sept. 15, 1959

2,904,686

DOUBLE-NULLING RADIATION COMPARISON SYSTEM

Carl R. Sebens, Stratford, Conn., assignor to The Perkin-Elmer Corporation, Norwalk, Conn., a corporation of New York Application September 27, 1955, Serial No. 536,827

3 Claims. (Cl. 250—43.5)

This invention is concerned with a null-type radiation analysis system. More particularly, it is directed to a radiation analysis system wherein three radiation paths are provided, two of which cooperatively perform the nulling function in a novel manner so as to afford a very high degree of precision and accuracy in the analysis measurement.

The solution of problems which involve the measurement of very minute variations in the concentration of a radiation absorptive component in a sample mixture become increasingly more difficult as the amplitude of such variations become smaller. This is substantially true of null-type as well as deflection-type instruments which measure radiation and radiation changes. Null-type instruments have certain advantages over deflection instruments, but the measurement of the intensity of radiation in the former type of system and its correlation to the concentration of a radiation absorptive component in a sample mixture has an accuracy which is limited in part by the fineness of degree to which the nulling radiation may be adjusted, whether the state of null is maintained by a secondary source or a radiation attenuator. The use of a secondary source to obtain balance between radiation beams necessarily sacrifices some of the advantages of a null-type system, such as comparative insensitivity to source fluctuations.

While a single source supplying all the radiation employed in a system overcomes the principal shortcomings of a dual radiation source, it necessitates on the other hand, the use of attenuation means to bring the system into a state of null. In a typical null system the attenuator may comprise an annular-like section of radiation opaque material having a gradually changing radial dimension. Such attenuators are not generally practical, however, for ranges of attenuation of less than 10%. The fabrication of an attenuator having a maximum range of attenuation of the order of 1% attenuation, for instance, with the requisite precision of calibration and range stability is extremely difficult, if not impossible to achieve with practicality. Yet many radiation absorption analysis problems exist which require comparable or finer degrees of measurement. The present invention is directed to the solution of these problems by a novel system which employs conventional components coacting in a unique fashion to bring about significantly improved and desirable results.

The principal object of the present invention is the precise adjustment of extremely small amounts of the nulling radiation in a null-type radiation analysis system.

Another object of the present invention is the improvement of the accuracy of measurement of minute fluctuations in the amount of radiation absorbed by a sample.

A further object of the present invention is the adaptation of known components to a radiation system which affords an order of precision of measurement markedly superior to that attainable by conventional systems.

Infrared absorption is one typical basis of operation of a null-type radiation analysis system which may incorporate the present invention to advantage.

It will be assumed therefore for purposes of illustration and explanation that an infrared absorption system embodies the present invention. In such a system the practice of the present invention contemplates a total amplitude of nulling infrared energy comprised of two components transmitted through two separate radiation paths. While the sample which is undergoing investigation is placed in an analysis path through which an amount of radiation is transmitted, the total nulling radiation energy is divided between first and second nulling paths, one of which transmits the major portion of the nulling energy and remains fixed in intensity, and the other of which transmits a relatively small remaining portion of the nulling energy. The second nulling path is adapted to pass a variable amount of radiation energy therethrough which can be regulated to maintain a state of balance or null between the radiation energy passing through the analysis path and the total radiation energy passing through the two nulling paths. The present invention affords the advantage of increasing the accuracy of the measurement of variation in total nulling energy by a factor which is substantially determined by the ratio of the total amount of radiation energy passing through both nulling paths to the maximum amount of radiation energy passed by the variable nulling path.

A better understanding of the present invention may be had from the following description and explanation of the operation of an embodiment of the present invention, together with the accompanying drawings, in which Fig. 1 is a schematic representation of an embodiment of the present invention, Fig. 2 is an illustration of one type of attenuator which may be used in a nondispersion infrared type embodiment of the present invention, Figs. 3 and 4 are illustrations of similar attenuators having different ranges, Fig. 5 is an elevational view of apparatus embodying a unitary range changer in accordance with the teaching of the present invention.

The present invention contemplates a system in which the sample under investigation is introduced into a single radiation path such as a nondispersive radiation absorption analysis system which determines the absorptive content of a sample mixture, and is best adapted to the solution of such problems as are not complicated by the necessity for sensitizing and compensating the radiation paths to effect acceptable results. In accordance with the teaching of the present invention, the sample occupies a portion of the first radiation path and a second radiation path may be employed to pass a predominant portion of the nulling energy required which may be 90% of the total nulling energy, for instance. A third radiation path which is calibrated and adjustably variable supplies the remaining 10% of the nulling energy required to effect system balance and maintain a state of null.

In such a system the variation in the amount of energy which is required to maintain a state of null is a measure of the variation in absorption by the sample under investigation. The present invention is particularly suited to the precise measurement of very small incremental variations in absorption by the sample under investigation and lends itself readily to a form which will accommodate a continuously flowing sample wherein it may be desired to measure extremely minute traces of a particular radiation absorptive component.

As shown in Fig. 1, a typical embodiment of the present invention may comprise a source S providing three beams of radiation which are initially of equal intensity and pass along three separate radiation paths 10, 11, and 12. One of these paths 10 has a sample chamber 13 which is adapted to receive the sample undergoing investigation. The sample may be a discrete portion of a fluid mixture, for instance, or it may be a continuous flow of fluid mixture tapped from a process stream. The fluid mixture may include any of numerous gases or liquids which do not completely absorb the radiation employed in the system.

The system is preferably of the "A.C." type and accordingly a chopper 14 which is opaque to the radiation employed in the system may be positioned and arranged to interrupt the radiation transmitted through the three paths 10, 11, and 12. The chopper 14 is driven at a constant speed by a motor 15 and is shaped so that the two nulling paths 11 and 12 are blocked in unison while radiation is allowed to pass along the analysis path 10; conversely, the analysis path 10 is blocked while the radiation is allowed to pass along both nulling paths 11 and 12. All three paths are arranged to converge their respective radiations upon a common detector 16 which produces a signal commensurate with the variations of its received radiation.

The signal produced by the detector 16 is amplified in a preamplifier 17 and an amplifier 18, whence it is fed to a phase sensitive demodulator 19. The motor 15 which drives the chopper device 14 also drives a generator 20 to produce an alternating signal in synchronism with the radiation chopping operation. The demodulator 19 produces a rectified signal proportional to any disparity which may exist between the radiation energy passed by the analysis path 10 and the total of the radiation energies passed by the two nulling paths 11 and 12. The output of the demodulator 19 is filtered in a filter 21 and fed to a servoamplifier 22 which in turn provides a servomotor 23 with appropriate power to actuate an adjustably variable attenuator 24 positioned in one of the nulling paths 11. The system is arranged and adjusted so that the amount of radiant energy passing through the adjustable nulling path 11 is regulated in response to the demodulator signal; the total amount of nulling energy passing through the two nulling paths 11 and 12 is varied so as to be constantly in balance with the amount of energy passed by the analysis path 10. Thus, as the amount of absorptive component in the analysis path 10 increases or decreases within the sample, a consistent balancing change takes place in the adjustably variable nulling path 11. The amount of such attenuation may be correlated to an electrical signal by mechanically linking the shaft 25 of the attenuator 24 to a wiper 26 of a potentiometer 27. The signal thus picked off actuates a recorder 28 after appropriate filtering in a filter 29.

In accordance with the teaching of the present invention, the nulling path 12 which passes a fixed amount of radiant energy supplies a substantially greater proportion of the total nulling energy than does the adjustably variable nulling path 11. Thus, in a typical embodiment the fixed nulling path 12 may supply 90% of the nulling energy required to maintain the system in a state of balance, whereas the nulling path 11 supplies radiant energy in an adjustable amount substantially of the order of 10% of the total nulling energy required to maintain the system in a state of balance. Any desired ratio between the two nulling paths may be effected by conventional trimmers, such as those shown at 30, 31, and 32 in the radiation paths 10, 11 and 12 respectively of Fig. 1.

One of the prime advantages of the present invention is that the amount of variation in the adjustable nulling path 11 may be very precisely regulated and accurately measured. To illustrate the difficulty of precise measurement of small increments of radiant energy by conventional systems, reference is made to Figs. 2, 3, and 4 in which several variable attenuators typical of those employed in the infrared instrumentation art are illustrated. These attenuators are intended to be used in the manner of the attenuator 24 illustrated in Fig. 1. It will be seen that the attenuator illustrated in Fig. 2, for instance, effects change in the amount of energy which it intercepts by a quite noticeable variation in the deviation of its periphery from concentricity. The attenuator shown in Fig. 3 has considerably less deviation, and that shown in Fig. 4 has even less deviation and, in fact, the variation in the width of the annulus of the latter attenuator is barely discernible within small segments of its periphery. The variable attenuator shown in Fig. 4 is, however, a 10% attenuator which, when used in a conventional system, will vary the energy passing through a radiation path over a 10% range; for example, the total range of variation afforded might be 90% to 100% if only one nulling path is employed in a radiation analysis system.

Using a 10% attenuator in the conventional two-beam system, it is most difficult to accurately measure incremental variations of the order of a small fraction of 1% in the concentration of radiation absorptive component in a sample. It would seem to follow quite logically that the difficulty of such measurements might be overcome by the use of an attenuator which has a maximum range of variation of the order of 1%, but the problems involved in fabricating such an attenuator are manifest to those skilled in the art. The use of an attenuator similar to the type illustrated by Figs. 2, 3, and 4 having a periphery varying from concentricity so as to afford a full range adjustment of the order of 1% or 2% or less, would likely render measurement very unreliable so far as accurary is concerned. This is evident from the fact that the variations of its periphery from concentricity would of necessity approach the infinitesimal within small increments. Linearity within minute increments would therefore be unreliable. This problem is further aggravated by the necessity of the entire range of the attenuator being consistently linear. It is readily apparent that any deformity suffered by such an attenuator in handling or use might be a source of major error in the system, however slight or imperceptible the damage may seem.

In accordance with the teaching of the present invention, a substantially greater proportion of the nulling energy passes through a first nulling path, and adjustment of the total nulling energy may be accomplished with a 10% attenuator, for example, such as is illustrated in Fig. 4. Accordingly, the maximum variation in percent attenuation which it is possible to achieve will be approximately 10% divided by the ratio of the total nulling energy of the system to that which may be passed through the second nulling path. Thus, if 10% of the nulling energy passes through the variable nulling path and a 10% attenuator is used to vary and adjust the amount of nulling energy required to maintain the system in a state of balance, a greater order of precision may be obtained in that the variably adjustable nulling energy may be adjusted through 10% of its maximum range, or 1% of the total nulling energy.

This greater degree of precision afforded by the present invention prevails with equal effectiveness for incremental variations, which are but a very small fraction of the maximum variation of attenuation possible. Minute fractional variations may be measured with an accuracy enhanced to an extent consistent with the division of the total nulling energy between the two nulling paths. Thus, in radiation analysis problems wherein a relatively very small variation of a particular radiation absorptive component must be discerned, the present invention affords a system whereby a conventional attenuator may be employed to achieve precision of adjustment and accuracy of measurement far beyond its capabilities in conventional systems, particularly as to small fractional variations.

In accordance with the teaching of the present invention the sum of the energy passed by the nulling beams has a maximum equal to the maximum energy passed by the analysis beam. Since the total nulling energy may be divided between the two nulling beams as desired, the system of the present invention therefore affords the further feature of a convenient and rapid means of changing range of the instrument by changing the ratio of the nulling energies passed by the two nulling paths.

As illustrated in Fig. 5, a preferred type of range changer may comprise an opaque member 33 having appropriately spaced apertures 34 and 35 positioned with respect to the two nulling paths 11 and 12 so that the total amount of energy passed by the nulling paths is always equal to the maximum amount of energy passed by the analysis path 10. The range changer 33 is movable laterally across the principal axis of the beams and one simple adjustment by means of a calibrated screw mechanism 36 connected to the range changer 33 and mounted on the instrument frame 37 determines the relative division of nulling energies between the two paths 11 and 12 and therefore establishes any desired range of nulling adjustment. It may be readily appreciated by those skilled in the art that an embodiment of the present invention which incorporates a unitary member to selectively vary the range of the system in a manner as illustrated in Fig. 5 requires little or no zero adjustment, since the total aperture areas 34 and 35 of the unitary range changer 33 passes a total nulling energy which is always equal to the maximum analysis path energy regardless of the range selected.

Another advantage of the unitary range changer 33 is that it affords variation of range of any desired value rather than several arbitrary settings. Accordingly, the range changer of the present invention may be calibrated for a continuusly variable series of adjustments.

Since many changes could be made in the specific combinations of apparatus disclosed herein and many apparently different embodiments of this invention could be made without departing from the scope thereof, it is intended that all matter contained in the foregoing description or shown in the accompanying drawings shall be interpreted as being illustrative and not in a limiting sense.

I claim:

1. In a null-type analyzer, the combination of a source of radiation, a detector for receiving radiation from the source and responding thereto, means defining an analysis path, means connected to said analysis path for introducing a sample therein, first and second nulling paths for passing radiation traveling from the source to the detector, said first and second nulling paths being isolated in fluid flow relationship from said analysis path, means for passing a fixed amount of radiation through said first nulling path, said radiant energy being of substantially greater intensity than that passing through said second nulling path, and means for varying the amount of energy passed by said second nulling path so that the sum of the energy passing through said nulling paths equals that passing through said analysis path.

2. In a null-type analyzer, the combination of a source of radiation, a detector for receiving radiation from the source and responding thereto, means defining an analysis path, means connected to said analysis path for introducing a sample therein, first and second nulling paths for passing radiation traveling from the source to the detector, said first and second nulling paths being isolated in fluid flow relationship from said analysis path, means for passing a fixed amount of radiant energy through said first nulling path, and means for varying the amount of energy passed by said second nulling path so that the sum of the energy passing through said nulling paths equals that passing through said analysis path, the maximum amount of energy passing through said second nulling path being less than one-tenth of that passing through said first nulling path.

3. In a null-type analyzer, the combination of a source of radiation, a detector for receiving radiation from the source and responding thereto, means defining an analysis path, means connected to said analysis path for introducing a sample therein, two separate nulling paths for passing radiation traveling from the source to the detector, said first and second nulling paths being isolated in fluid flow relationship from said analysis path, radiation opaque means positioned adjacent said nulling paths and having openings therethrough for permitting the passage of radiation, means for adjusting the position of said last-named means relative to said nulling paths whereby to vary the ratio of maximum radiation passed by said nulling paths, means for periodically blocking said paths, said nulling paths being blocked simultaneously and out of phase with said analysis path, means for adjustably varying the amount of radiation energy passing through only one of said nulling paths, and means responsive to the signal of said detector for controlling the energy passing through said adjustable nulling path so that the sum of the energy passing through both of said nulling paths is equal to that passing through said analysis path.

References Cited in the file of this patent

UNITED STATES PATENTS

| | | |
|---|---|---|
| 2,688,089 | Williams | Aug. 31, 1954 |
| 2,688,090 | Woodhull et al. | Aug. 31, 1954 |
| 2,698,390 | Liston | Dec. 28, 1954 |
| 2,718,597 | Heigl et al. | Sept. 20, 1955 |
| 2,754,424 | Woodhull et al. | July 10, 1956 |